United States Patent
Han et al.

(10) Patent No.: US 11,906,007 B2
(45) Date of Patent: Feb. 20, 2024

(54) S-CAM BRAKE

(71) Applicants: HYUNDAI MOTOR COMPANY, Seoul (KR); KIA CORPORATION, Seoul (KR)

(72) Inventors: Sang Weol Han, Hwaseong-si (KR); Jung Hoon Jin, Hwaseong-si (KR); Yoon Hwan Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 127 days.

(21) Appl. No.: 17/517,154

(22) Filed: Nov. 2, 2021

(65) Prior Publication Data
US 2023/0032911 A1 Feb. 2, 2023

(30) Foreign Application Priority Data
Jul. 27, 2021 (KR) .................. 10-2021-0098711

(51) Int. Cl.
*F16D 65/22* (2006.01)
*F16D 65/00* (2006.01)
(Continued)

(52) U.S. Cl.
CPC ............. *F16D 65/22* (2013.01); *F16D 51/22* (2013.01); *F16D 51/24* (2013.01);
(Continued)

(58) Field of Classification Search
CPC ...... F16D 2125/30; F16D 51/22; F16D 65/22; F16D 2125/28; F16D 51/24;
(Continued)

(56) References Cited

U.S. PATENT DOCUMENTS 3,181,433 A * 5/1965 Cruse .................. B60T 17/083
92/52
3,205,020 A * 9/1965 Schubert .............. B60T 17/081
92/24
(Continued)

FOREIGN PATENT DOCUMENTS

KR 1997-0011483 A 3/1997
KR 10-2019-0125587 A 11/2019

*Primary Examiner* — Robert A. Siconolfi
*Assistant Examiner* — Mahbubur Rashid
(74) *Attorney, Agent, or Firm* — Morgan, Lewis & Bockius LLP (57) ABSTRACT

An S-cam brake including a brake chamber to which compressed air is supplied; a slack adjuster rotatably connecting to the brake chamber; an S-cam unit having an S-cam connecting to and rotating around the slack adjuster; and a drum having a lining generating braking force with widening according to rotation of the S-cam is provided, wherein the brake chamber includes an upper housing having an air supply port through which compressed air is introduced; a lower housing coupled to the upper housing to form an internal space; a diaphragm having edges fixed to the upper housing and the lower housing and deformed by compressed air; a piston disposed to contact the diaphragm and move linearly; a piston push rod extending from the piston and having one end connected to the slack adjuster; and a spring having one end supported by the piston and the other end supported by the lower housing, wherein a thickness of the upper housing is greater than a thickness of the lower housing.

10 Claims, 5 Drawing Sheets

(51) Int. Cl.
*F16D 51/24* (2006.01)
*F16D 51/22* (2006.01)
*F16D 125/30* (2012.01)
*F16D 121/08* (2012.01)
*F16D 65/38* (2006.01)

(52) U.S. Cl.
CPC .......... *F16D 65/0006* (2013.01); *F16D 65/38* (2013.01); *F16D 2121/08* (2013.01); *F16D 2125/30* (2013.01); *F16D 2200/0013* (2013.01); *F16D 2250/0007* (2013.01)

(58) Field of Classification Search
CPC .......... F16D 65/546; F16D 2250/0007; F16D 51/52; F16D 65/0006; F16D 65/38; F16D 2121/08; F16D 2125/12; F16D 2125/582; B60T 17/083; B60T 13/261; B60T 13/44; B60T 13/26; B60T 13/38; B60T 13/52; B60T 13/683; B60T 13/686; B60T 17/08; B60T 17/081; B60T 8/362
See application file for complete search history.

(56) References Cited

U.S. PATENT DOCUMENTS

| | | | | |
|---|---|---|---|---|
| 3,331,291 A * | 7/1967 | Rumsey | ................ | B60T 17/083 267/176 |
| 3,926,094 A * | 12/1975 | Kurichh | ................ | B60T 17/083 188/170 |
| 4,334,838 A * | 6/1982 | Fessler | ................ | F04B 43/0054 92/99 |
| 4,446,699 A * | 5/1984 | Fujii | .................... | B60T 13/565 91/369.3 |
| RE32,885 E * | 3/1989 | Graham | ................ | B60T 13/261 92/24 |
| 5,771,774 A * | 6/1998 | Stojic | .................... | B60T 17/085 29/888.06 |
| 5,887,687 A * | 3/1999 | Williams | ................ | F16D 51/22 188/79.55 |
| 7,055,662 B1 * | 6/2006 | Jones | .................... | F16D 65/22 188/329 |
| 7,121,191 B1 * | 10/2006 | Fisher | .................. | B60T 17/083 92/63 |
| 8,803,514 B2 * | 8/2014 | Newman | ................ | G01D 5/145 324/207.24 |
| 9,574,626 B1 * | 2/2017 | Berwanger | ............. | F16D 65/60 |
| 9,969,377 B2 * | 5/2018 | Arkan | .................... | B60T 17/088 |
| 10,106,140 B2 * | 10/2018 | Shimomura | .......... | F16J 15/56 |
| 10,166,963 B2 * | 1/2019 | Arkan | .................... | B60T 17/088 |
| 2002/0171285 A1 * | 11/2002 | Nelander | ................ | B60T 7/107 188/106 P |
| 2004/0134344 A1 * | 7/2004 | Fisher | .................... | B60T 17/08 92/78 |
| 2014/0345994 A1 * | 11/2014 | Varela | .................... | F16D 51/20 188/329 |
| 2017/0210370 A1 * | 7/2017 | Arkan | .................... | B60T 17/081 |
| 2017/0274887 A1 * | 9/2017 | Fisher | .................... | F16D 65/28 |
| 2019/0331182 A1 | 10/2019 | Gim | | |

* cited by examiner

S-CAM BRAKE

CROSS-REFERENCE TO RELATED APPLICATION(S)

This application claims benefit of priority to Korean Patent Application No. 10-2021-0098711 filed on Jul. 27, 2021 in the Korean Intellectual Property Office, the disclosure of which is incorporated herein by reference in its entirety.

TECHNICAL FIELD

The present disclosure relates to an S-cam brake.

BACKGROUND

In general, an S-cam brake may be a type of brake in which rotational force of an S-cam from compressed air supplied when a brake pedal is operated is used to form braking force of a vehicle.

An S-cam brake may secure braking stability without deviation of frictional force between leftward and rightward linings on a drum by uniform leftward and rightward sliding due to rotation of the S-cam, and may mainly be applied to large commercial vehicles.

However, an S-cam brake according to the prior art may have a problem in that, when a driver operates a brake pedal, and a rotation direction of an S-cam is opposite to a rotation direction of a brake drum, vibrations and noise may be significantly generated.

The above descriptions regarding background technologies have been made only to help understanding of the background of the present disclosure, and are not to be deemed by those skilled in the art to correspond to already-known prior arts, and should not be taken as acknowledgment that this information forms any part of prior art.

SUMMARY

An aspect of the present disclosure is to provide an S-cam brake capable of reducing vibration and noise generation.

According to an aspect of the present disclosure, an S-cam brake includes a brake chamber to which compressed air is supplied; a slack adjuster rotatably connected to the brake chamber; an S-cam unit having an S-cam connected to and rotating around the slack adjuster; and a drum having a lining generating braking force with widening according to rotation of the S-cam.

Wherein the brake chamber includes an upper housing having an air supply port through which compressed air is introduced; a lower housing coupled to the upper housing to form an internal space; a diaphragm having edges fixed to the upper housing and the lower housing and deformed by compressed air; a piston disposed to contact the diaphragm and move linearly; a piston push rod extending from the piston and having one end connected to the slack adjuster; and a spring having one end supported by the piston and the other end supported by the lower housing, wherein a thickness of the upper housing is greater than a thickness of the lower housing.

According to another aspect of the present disclosure, an S-cam brake includes a brake chamber to which compressed air is supplied; a slack adjuster rotatably connected to the brake chamber; an S-cam unit having an S-cam connected to and rotating around the slack adjuster; and a drum having a lining generating braking force with widening according to rotation of the S-cam, wherein the brake chamber includes an upper housing having an air supply port through which compressed air is introduced; a lower housing coupled to the upper housing to form an internal space; and a diaphragm having edges fixed to the upper housing and the lower housing and deformed by compressed air, wherein a weight of the upper housing is 8.0 Kg to 9.7 Kg to function as a damper absorbing noise and vibrations.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described in detail with reference to the accompanying drawings. The embodiments of the present disclosure may be modified to have various other forms, and the scope of the present disclosure is not limited to the embodiments described below. Embodiments of the present disclosure may be also provided to more fully describe the present disclosure to those skilled in the art. Therefore, the shapes and sizes of the elements in the drawings may be exaggerated for clarity, and the elements denoted by the same reference numerals in the drawings are the same elements.

In the attached drawings, like numerals are used to represent like elements. In the drawings, the dimensions of the elements are enlarged for easier understanding of the present disclosure. Although the terms first, second, etc. may be used to describe various elements, these elements should not be limited by the terms. The terms are used only to distinguish one element from another. For example, a first element can be termed a second element and, similarly, a second element can be termed a first element without departing from the scope of the present disclosure. A singular expression includes a plural expression unless the context clearly indicates otherwise.

In the present disclosure, terms such as "include", "contain", "have", etc. should be understood as designating that features, numbers, steps, operations, elements, parts or combinations thereof exist and not as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" the another element or an intervening element may also be present. Likewise, when an element such as a layer, a film, a region, a substrate, etc. is referred to as being "under" another element, it can be "directly under" the another element or an intervening element may also be present.

Unless specified otherwise, all the numbers, values and/or expressions representing the amount of components, reaction conditions, polymer compositions or mixtures are approximations reflecting various uncertainties of measurement occurring in obtaining those values and should be understood to be modified by "about". Also, unless specified otherwise, all the numerical ranges disclosed in the present disclosure are continuous and include all the values from the minimum values to the maximum values included in the ranges. In addition, when the ranges indicate integers, all the integers from the minimum values to the maximum values included in the ranges are included unless specified otherwise.

Figure 1:
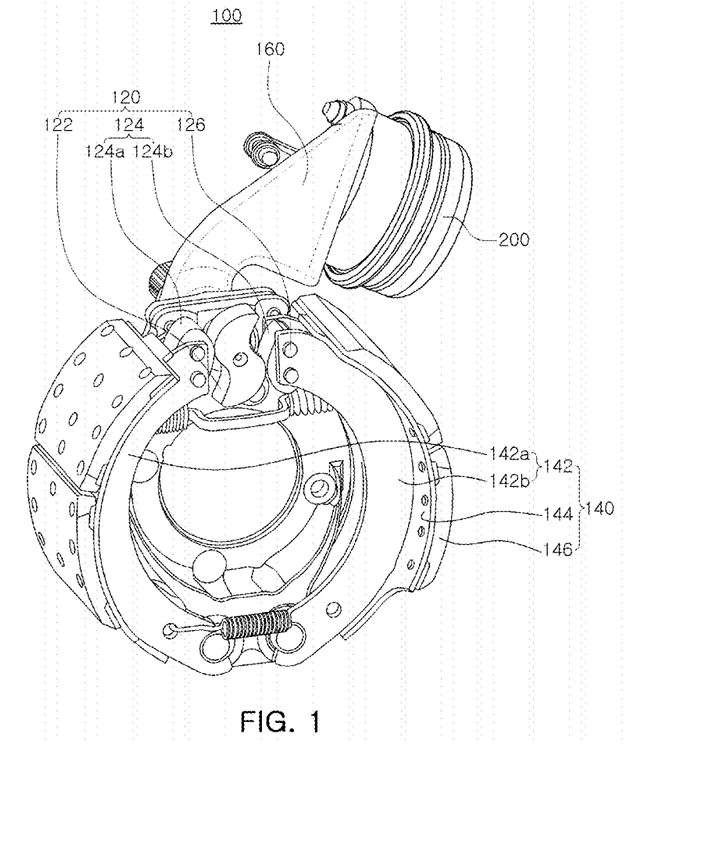
FIG. 1 is a perspective view illustrating an S-cam brake according to an example embodiment of the present disclosure.
Figure 2:
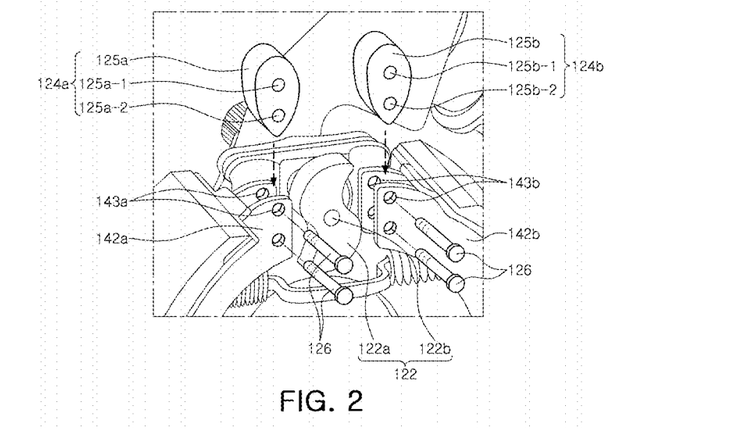
FIG. 2 is a detailed configuration diagram of the S-cam unit illustrated in FIG. 1.

FIG. 1 is a perspective view illustrating an S-cam brake according to an example embodiment of the present disclosure, and FIG. 2 is a detailed configuration diagram of the S-cam unit illustrated in FIG. 1.

Referring to FIG. 1, an S-cam brake 100 according to an example embodiment of the present disclosure may include an S-cam unit 120, a drum 140, a slack adjuster 160, and a brake chamber 200.

The S-cam unit 120 may include, as an example, an S-cam 122, a horizontal tangent member 124 and a fixing member 126. The S-cam 122 may have an involute tooth shape, and may have an "S" shape. In addition, the horizontal tangent member 124 may include, for example, a pair of involute cams 124a and 124b having involute teeth, and the pair of involute cams 124a and 124b may be disposed on leftward and rightward sides of the S-cam 122. In addition, the fixing member 126 may serve as a rotation center of a shoe web 142 to be described later, while fixing the pair of involute cams 124a and 124b.

In this case, referring to the S-cam unit 120 in more detail, as illustrated in FIG. 2, the S-cam 122 may be formed of an S-cam profile body 122a having an "S" shape and having an involute tooth shape, and a cam pin 122b may be coupled to a center of the S-cam profile body 122a. When the S-cam 122 rotates, the S-cam profile body 122a may rotate about the cam pin 122b as a rotation center. As such, the S-cam 122 may be identical to a conventional S-cam applied to the S-cam brake 100.

Specifically, the horizontal tangent member 124 may be provided as a pair thereof, divided into a leftward involute cam 124a and a rightward involute cam 124b. The leftward involute cam 124a and the rightward involute cam 124b may include an involute cam profile body 125a, an upper center hole 125a-1, and a lower center hole 125a-2, respectively.

The involute cam profile body 125a may have, for example, an egg shape and an involute tooth shape. The upper center hole 125a-1 may be perforated upwardly with respect to the center of the involute cam profile body 125a, and the lower center hole 125a-2 may be perforated downwardly with respect to the center of the involute cam profile body 125a. As an example, the egg shape of the involute cam profile body 125a may form vertical and horizontal symmetry with respect to the center thereof.

The fixing member 126 may be formed of a pin or a bolt. In addition, the fixing member 126 may be coupled to the upper center hole 125a-1 and the lower center hole 125a-2 of the leftward involute cam 124a and the rightward involute cam 124b, in a state in which the leftward involute cam 124a and the rightward involute cam 124b are fitted in a "C"-shaped portion of a leftward shoe web 142a and a rightward shoe web 142b, which will be described later. For this purpose, a fastening hole 143a may be perforated a "C"-shaped portion of a leftward shoe web 142a and a rightward shoe web 142b, which will be described later.

Therefore, the fixing member 126 may fix each of the leftward involute cam 124a and the rightward involute cam 124b, fitted into the fastening hole 143a, the upper center hole 125a-1, and the lower center hole 125a-2 and inserted into the "C"-shaped portion of the leftward shoe web 142a and the rightward shoe web 142b.

Referring again to FIG. 1, the drum 140 may include, as an example, a shoe web 142, a rim 144, and a lining 146. The shoe web 142 may be coupled to the pair of involute cams 124a and 124b, and may be widened according to movement of the involute cams 124a and 124b. The rim 144 may be coupled to the shoe web 142, and may be widened together with the shoe web 142. The lining 146 may be coupled to the rim 144, and may be widened together with the rim 144. In particular, since the shoe web 142 is divided into leftward and rightward shoe webs 142a and 142b facing each other with the S-cam unit 120 interposed therebetween, the rim 144 and the lining 146 may be also configured to be provided as in pairs, accordingly. In this case, the leftward shoe web 142a may be coupled to the leftward involute cam 124a, and may be widened according to movement of the leftward involute cam 124a, and the rightward shoe web 142b may be coupled to the rightward involute cam 124b, and may be widened according to movement of the rightward involute cam 124b.

The slack adjuster 160 may be connected to the S-cam unit 120 and the brake chamber 200. In addition, the slack adjuster 160 may be operated by the brake chamber 200, to rotate the S-cam 122 connected to the slack adjuster 160. For example, the brake chamber 200 may receive compressed air generated from pneumatic mechanism when a driver operates a brake pedal, and may push a piston push rod (250, referring to FIG. 3), which will be described later, connected to the slack adjuster 160. The piston push rod 250 may generate movement of the slack adjuster 160, pushing the slack adjuster 160 to rotate the S-cam 122.

As described above, the brake chamber 200 may be connected to the S-cam unit 120 by the slack adjuster 160 to rotate the S-cam 122 of the S-cam unit 120. As the S-cam 122 is rotated as described above, the lining 146 of the drum 140 may be finally widened, and eventually, braking force for stopping a vehicle may be generated.

Hereinafter, the brake chamber 200 according to an embodiment of the present disclosure will be described in more detail with reference to the drawings.

Figure 3:
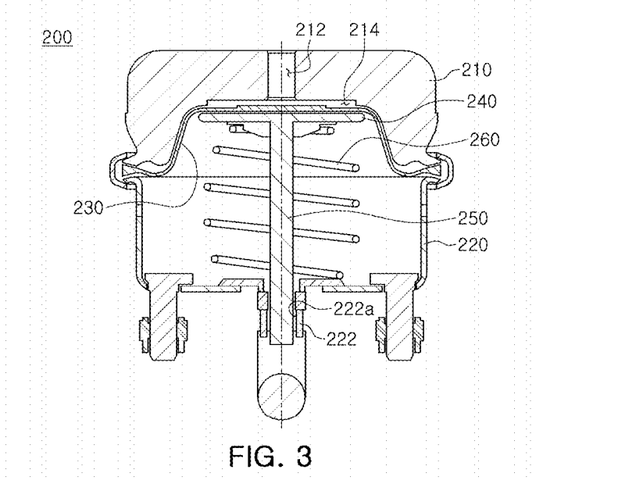
FIG. 3 is a schematic cross-sectional view illustrating a brake chamber according to an embodiment of the present disclosure.
Figure 4:
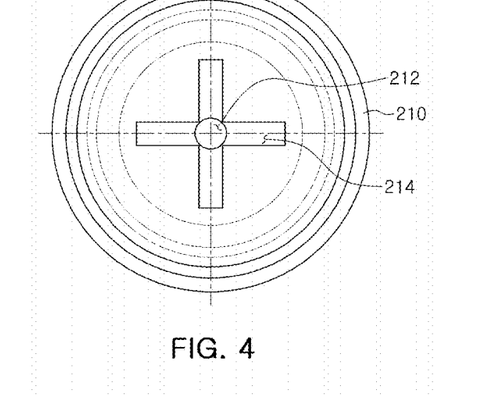
FIG. 4 is a bottom view illustrating an embodiment of the upper housing of the brake chamber illustrated in FIG. 3.

FIG. 3 is a schematic cross-sectional view illustrating a brake chamber 200 according to an embodiment of the present disclosure, and FIG. 4 is a bottom view illustrating the upper housing 210 of the brake chamber.

Referring to FIGS. 3 and 4, a brake chamber 200 may include, as an example, an upper housing 210, a lower housing 220, a diaphragm 230, a piston 240, a piston push rod 250, and a spring 260.

The upper housing 210 may be coupled to the lower housing 220, and may form an internal space together with the lower housing 220. The upper housing 210 may be provided with an air supply port 212 receiving compressed air, the air supply port 212 may be disposed, for example, in a central portion of the upper housing 210. In addition, a channel 214 connected to the air supply port 212 may be provided on a bottom surface of the upper housing 210. As an example, the channel 214 may be formed of a groove having a '+' shape, in bottom view. The channel 214 may be provided in the upper housing 210 to deform the diaphragm 230 by pressing the diaphragm 230 after compressed air supplied through the air supply port 212 reaches a predetermined pressure.

Referring thereto in more detail, when the channel 214 is not provided in the upper housing 210, the diaphragm 230 may be directly deformed by the compressed air passing through the air supply port 212 of the upper housing 210, and the piston 240 may descend. In this case, a predetermined space may be formed between the diaphragm 230 and the upper housing 210 by the deformation of the diaphragm 230. In this case, as a space is formed between an upper surface of the deformed diaphragm 230 and a bottom surface of the upper housing 210, a space may be also formed between a side surface of the deformed diaphragm 230 and the bottom surface of the upper housing 210. As such, when the diaphragm 230 is deformed, a volume of the space may rapidly increase while pressure rapidly decreases. Therefore, as the piston 240 moves in an upward direction by restorative force of the spring 260, the diaphragm 230 may be also deformed in an upward direction. As such, when compressed air is supplied, there may be a problem in that the piston 240 and the piston push rod 250 perform operations of moving in a downward direction and then moving in an upward direction again.

As in an embodiment of the present disclosure, when the channel 214 having a larger cross-sectional area than the air supply port 212 is formed in the upper housing 210, the diaphragm 230 may not be deformed until compressed air passing through the air supply port 212 is transferred to the channel 214, and a predetermined pressure is reached. Thereafter, when the predetermined pressure is reached, the diaphragm 230 may be deformed, and the piston 240 and the piston push rod 250 may move in a downward direction. As such, according to an embodiment of the present disclosure, operations of the piston 240 and the piston push rod 250 by the channel 214 may be stably performed.

As an example, the channel 214 may have a width of 4 mm to 8 mm, a depth of 4 mm to 8 mm, and a length of 80 to 100 mm. The width, depth, and length of the channel 214 may have a range of values in which the piston 240 and the piston push rod 250 may stably operate while minimizing a reduction in weight of the upper housing 210. For example, when the width, depth, and length of the channel 214 are less than the above numerical ranges, operations of the piston 240 and the piston push rod 250 may not be stably performed, and when the width, depth, and length of the channel 214 are greater than the above numerical range, a weight of the upper housing 210 may be reduced, such that the upper housing 210 may not serve as a mass damper. The width, depth, and length of the channel 214 are not limited to the above ranges, and the width, depth, and length of the channel 214 will be variously changeable such that an area in which compressed air is in contact with the diaphragm 230 meets a predetermined area.

The upper housing 210 may serve as a damper. For example, the upper housing 210 may serve to absorb noise and vibrations generated when operating the S-cam brake 100 described above. To this end, the upper housing 210 may be formed of a casting containing an iron component.

For example, a thickness of a central portion of the upper housing 210 may be 30 mm to 36 mm. In addition, a weight of the upper housing 210 may be 8.0 Kg to 9.7 Kg.

Referring thereto in more detail, conventionally, the upper housing 210 may be formed of a 2 mm to 3 mm steel plate, and may serve to transmit noise and vibrations generated when operating the S-cam brake 100 to a vehicle body. For example, when a vehicle is driven in a backward direction and a rotation direction of the S-cam 122 and a wheel of the vehicle are opposite, in operating a brake pedal by a driver, a direction of force to be applied to the S-cam 122 and the shoe web 142 of the drum 140 may be in an opposite direction, such that movement may occur when the S-cam 122 rotates. Therefore, resonance may be generated by leftward and rightward rotational vibrations of the S-cam 122. Thereafter, resonance may be transmitted to the brake chamber 200 through the slack adjuster 160 to generate noise and vibrations. In addition, noise and vibrations generated from the brake chamber 200 may be transmitted to the vehicle through the S-cam brake 100.

In an embodiment of the present disclosure, the upper housing 210 may be manufactured to have a weight of 8.0 kg to 9.7 kg, such that the upper housing 210 may serve as a mass damper. For example, when a weight of the upper housing 210 is 3.2 kg, a long sound of 85 dB may be generated and vibration may be generated, and when a weight of the upper housing 210 is 7.8 kg, a long sound of 73 dB may be generated and vibration may be generated. It was confirmed that noise and vibrations were not generated when a weight of the upper housing 210 was 8.0 kg or more. When a weight of the upper housing 210 is 9.7 kg or more, the weight of the upper housing 210 may become heavy, and when combined with the lower housing 220 and used for a long time, the lower housing 220 may be deformed. Furthermore, when a thickness of the central portion of the upper housing 210 is less than 30 mm, it may not perform a function as a mass damper, and when a thickness of the central portion of the upper housing 210 exceeds 36 mm, there may be a problem in that the brake chamber 200 may not be mounted on a vehicle due to an increase in size of the brake chamber 200. Also, the upper housing 210 may have a thickness greater than that of the lower housing 220, and may have, for example, a thickness of 5 times or more and 20 times or less of a thickness of the lower housing 220.

As described above, the upper housing 210 may absorb noise and vibrations generated when operating the S-cam brake 100, to reduce noise and vibrations generated when operating the S-cam brake 100 or remove the noise and vibrations. In addition, in an embodiment of the present disclosure, the upper housing 210 may be formed of a casting containing an iron component. For example, conventionally, since the upper housing 210 may be manufactured by pressing a 2 mm to 3 mm steel plate, there may be a limit in increasing a weight of the upper housing 210 by press processing. For example, there may be a problem in that it may be difficult to manufacture the upper housing 210 having a sufficient weight to remove noise and vibrations by press processing. Therefore, in an embodiment of the present disclosure, the upper housing 210 may be formed of a casting containing an iron component.

The largest diameter among diameters of the upper housing 210 may be 16 inches (in).

The lower housing 220 may be coupled to the upper housing 210, and may form an internal space together with the upper housing 210. As an example, a volume of the internal space formed by the lower housing 220 may be larger than a volume of the internal space formed by the upper housing 210. In addition, an installation hole 222 through which the piston push rod 250 is installed may be provided in a central portion of the lower housing 220. The installation hole 222 may be disposed to protrude from a bottom surface of the lower housing 220, and may be provided in a through-hole 222a to allow the piston push rod 250 to pass therethrough. Therefore, the piston push rod 250 may be guided by the installation hole 222, to stably move in upward and downward directions.

Edges of the diaphragm 230 may be fixed by the upper housing 210 and the lower housing 220, and may be disposed to contact the bottom surface of the upper housing 210 when compressed air is not supplied. As an example, the diaphragm 230 may be formed of a material having elasticity that may be restored to its original shape after deformation. The diaphragm 230 may serve to move the piston 240 and the piston push rod 250 while being deformed when compressed air is supplied, and may be deformed as the original shape by restorative force of the spring 260, when the supply of the compressed air is completed.

The piston 240 may be disposed to contact a bottom surface of the diaphragm 230. As an example, the piston 240 may have a circular plate shape. As an example, the piston 240 may be integrally formed with the piston push rod 250, and may be jointly installed at one end of the piston push rod 250. As described above, when the diaphragm 230 is deformed, the piston 240 may be moved in one direction by the diaphragm 230, and may be moved in the other direction by restorative force of the spring 260.

The piston push rod 250 may extend from the piston 240, and one end portion thereof may be disposed to protrude from the lower housing 220. The piston push rod 250 may be connected to the slack adjuster 160, the slack adjuster 160 may be rotated according to elevation of the piston push rod 250. Therefore, the S-cam 122 connected to the slack adjuster 160 may be rotated.

The spring 260 may be disposed such that one end thereof is supported by the piston 240 and the other end thereof is supported on the bottom surface of the lower housing 220. The piston push rod 250 may be disposed to pass through the spring 260. As an example, the spring 260 may be a coil spring. The spring 260 may be contracted when compressed air is supplied, and may be stretched by restorative force when the supply of the compressed air stops. Therefore, the diaphragm 230 may be restored to its original shape.

As described above, according to an embodiment of the present disclosure, noise and vibrations generated during an operation may be absorbed by the upper housing 210 serving as a mass damper, to reduce the noise and vibrations. Referring thereto in more detail, conventionally, the upper housing 210 may be formed of a 2 mm to 3 mm steel plate, and may serve to transmit noise and vibrations generated when operating the S-cam brake 100 to a vehicle body. For example, when a vehicle is driven in a backward direction and a rotation direction of the S-cam 122 and a wheel of the vehicle are opposite, in operating a brake pedal by a driver, a direction of force to be applied to the S-cam 122 and the shoe web 142 of the drum 140 may be in an opposite direction, such that movement may occur when the S-cam 122 rotates. Therefore, resonance may be generated by leftward and rightward rotational vibrations of the S-cam 122. Thereafter, resonance may be transmitted to the brake chamber 200 through the slack adjuster 160 to generate noise and vibrations. In addition, noise and vibrations generated from the brake chamber 200 may be transmitted to the vehicle through the S-cam brake 100.

In an embodiment of the present disclosure, the upper housing 210 may be manufactured to have a weight of 8.0 kg to 9.7 kg, such that the upper housing 210 may serve as a mass damper. Therefore, even when resonance is generated by leftward and rightward rotational vibrations of the S-cam 122, noise and vibrations transmitted to the brake chamber 200 may be absorbed by the upper housing 210 to reduce or eliminate the noise and vibrations.

Furthermore, since the diaphragm 230 may not be deformed until compressed air to be supplied stays in the channel 214 and a pressure thereof reaches a predetermined pressure, and the diaphragm 230 may be deformed when a pressure thereof reaches the predetermined pressure, operations of the piston 240 and the piston push rod 250 may be smoothly performed. For example, since the diaphragm 230 may not be deformed until compressed air to be supplied stays in the channel 214 and a pressure thereof reaches a predetermined pressure, the piston 240 and the piston push rod 250 may move in one direction and may prevent then from movement thereof in the other direction.

Hereinafter, a modified embodiment of the present disclosure will be described with reference to the drawings.

Figure 5:
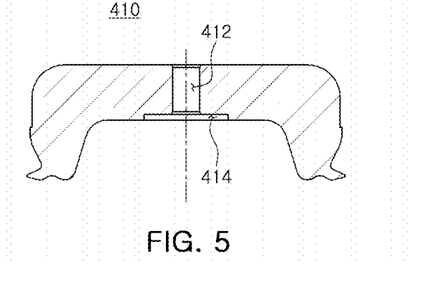
FIG. 5 is a cross-sectional view illustrating a first modified embodiment of an upper housing of a brake chamber.
Figure 6:
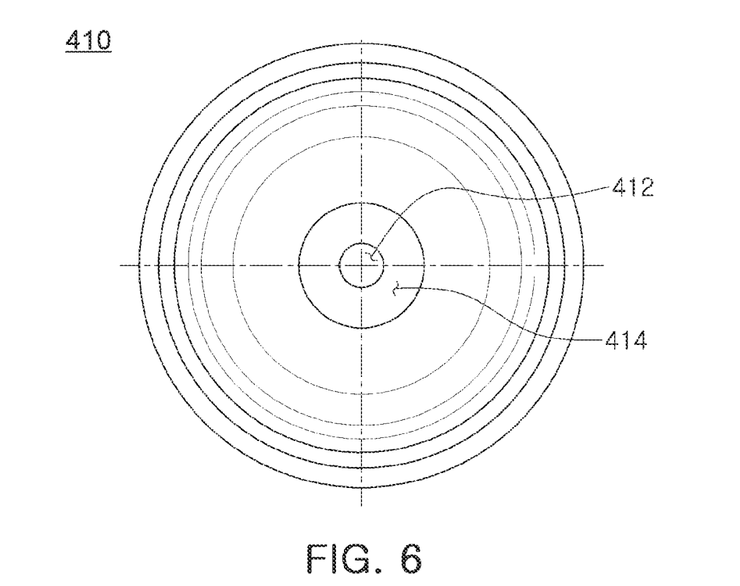
FIG. 6 is a bottom view illustrating a first modified embodiment of an upper housing of a brake chamber.

FIG. 5 is a cross-sectional view illustrating a first modified embodiment of an upper housing of a brake chamber, and FIG. 6 is a bottom view illustrating a first modified embodiment of an upper housing of a brake chamber.

Referring to FIGS. 5 and 6, an upper housing 410 may be coupled to a lower housing 220 (refer to FIG. 3), and may form an internal space together with the lower housing 220. An air supply port 412 receiving compressed air may be provided in the upper housing 410, and the air supply port 412 may be disposed, for example, in a central portion of the upper housing 410. In addition, a channel 414 connected to the air supply port 412 may be provided on a bottom surface of the upper housing 410. As an example, the channel 414 may be formed of a groove having a circular shape, in bottom view. The channel 414 may be provided in the upper housing 410 to deform a diaphragm 230 by pressing the diaphragm 230 after compressed air supplied through the air supply port 412 reaches a predetermined pressure.

As an example, a diameter of the channel 414 may be set to configure that an area in which compressed air is in contact with the diaphragm 230 is similar to an area in which the compressed air is in contact with the diaphragm 230 by the channel 214, as described in the above embodiment.

The upper housing 410 may serve as a damper. For example, the upper housing 410 may serve to absorb noise and vibrations generated when operating the S-cam brake 100 described above (refer to FIG. 1). To this end, the upper housing 410 may be formed of a casting containing an iron component. For example, a thickness of a central portion of the upper housing 410 may be 30 mm to 36 mm. In addition, a weight of the upper housing 410 may be 8.0 Kg to 9.7 Kg.

Figure 7:
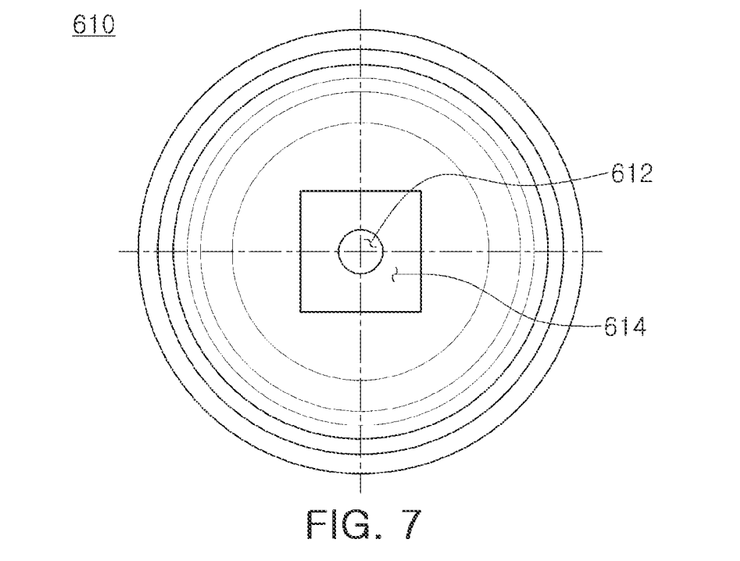
FIG. 7 is a bottom view illustrating a second modified embodiment of an upper housing of a brake chamber.

FIG. 7 is a bottom view illustrating a second modified embodiment of an upper housing of a brake chamber.

Referring to FIG. 7, an upper housing 610 may be coupled to a lower housing 220 (refer to FIG. 3), and may form an internal space together with the lower housing 220. An air supply port 612 receiving compressed air may be provided in the upper housing 610, and the air supply port 612 may be disposed, for example, in a central portion of the upper housing 610. In addition, a channel 614 connected to the air supply port 612 may be provided on a bottom surface of the upper housing 610. As an example, the channel 614 may be formed of a groove having a polygonal shape such as a square or the like, in bottom view. The channel 614 may be provided in the upper housing 610 to deform a diaphragm 230 (refer to FIG. 3) by pressing the diaphragm 230 after compressed air supplied through the air supply port 612 reaches a predetermined pressure.

As an example, a width and a length of the channel 614 may be set to configure that an area in which compressed air is in contact with the diaphragm 230 is similar to an area in which the compressed air is in contact with the diaphragm 230 by the channel 214, as described in the above embodiment.

The upper housing 610 may serve as a damper. For example, the upper housing 610 may serve to absorb noise and vibrations generated when operating the S-cam brake 100 described above (refer to FIG. 1). To this end, the upper housing 610 may be formed of a casting containing an iron component. For example, a thickness of a central portion of the upper housing 610 may be 30 mm to 36 mm. In addition, a weight of the upper housing 610 may be 8.0 Kg to 9.7 Kg.

Figure 8:
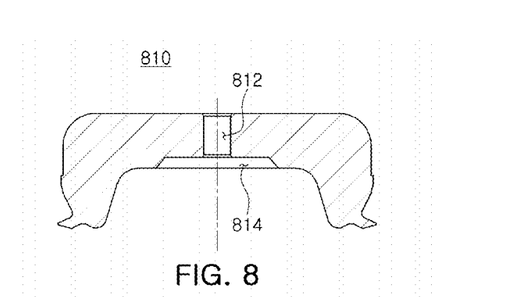
FIG. 8 is a cross-sectional view illustrating a third modified embodiment of an upper housing of a brake chamber.
Figure 9:
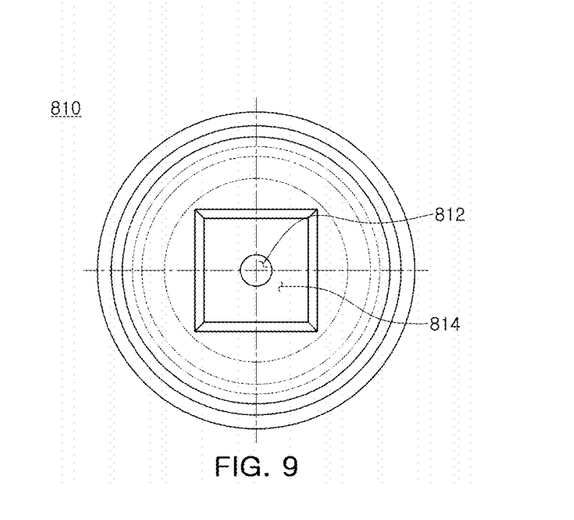
FIG. 9 is a bottom view illustrating a third modified embodiment of an upper housing of a brake chamber.

FIG. 8 is a cross-sectional view illustrating a third modified embodiment of an upper housing of a brake chamber, and FIG. 9 is a bottom view illustrating a third modified embodiment of an upper housing of a brake chamber.

Referring to FIGS. 8 and 9, an upper housing 810 may be coupled to a lower housing 220 (refer to FIG. 3), and may form an internal space together with the lower housing 220. An air supply port 812 receiving compressed air may be provided in the upper housing 810, and the air supply port 812 may be disposed, for example, in a central portion of the upper housing 810. In addition, a channel 814 connected to the air supply port 812 may be provided on a bottom surface of the upper housing 810. As an example, the channel 814 may be formed of a groove having a rectangular funnel shape in which a lower portion thereof is wider than an upper portion thereof, as illustrated in FIG. 8. Also, the channel 814 may have a polygonal funnel shape. As such, compressed air supplied to the air supply port 812 by the channel 814 having a funnel shape may be smoothly spread and filled in the internal space formed by the channel 814. Then, the channel 814 may be provided in the upper housing 810 to deform a diaphragm 230 (refer to FIG. 3) by pressing the diaphragm 230 after compressed air supplied through the air supply port 812 reaches a predetermined pressure.

The upper housing 810 may serve as a damper. For example, the upper housing 810 may serve to absorb noise and vibrations generated when operating the S-cam brake 100 described above (refer to FIG. 1). To this end, the upper housing 810 may be formed of a casting containing an iron component. For example, a thickness of a central portion of the upper housing 810 may be 30 mm to 36 mm. In addition, a weight of the upper housing 810 may be 8.0 Kg to 9.7 Kg.

According to an aspect of the present disclosure, an effect of reducing generation of vibration and noise may be provided.

As described above, while experimental examples and examples of the present disclosure have been illustrated and described above, the scope of the present disclosure is not limited to the above-disclosed experimental examples and embodiments, and it will be apparent to those skilled in the art that various modifications and variations could be made without departing from the scope of the present disclosure as defined by the appended claims, and are included in the scope of the present disclosure.

What is claimed is:

1. An S-cam brake comprising:
a brake chamber to which compressed air is supplied;
a slack adjuster rotatably connected to the brake chamber;
an S-cam unit having an S-cam connected to and rotating around the slack adjuster; and
a drum having a lining generating braking force with widening according to rotation of the S-cam,
wherein the brake chamber comprises:
an upper housing having an air supply port through which the compressed air is introduced;
a lower housing coupled to the upper housing to form an internal space;
a diaphragm having edges fixed to the upper housing and the lower housing and deformed by the compressed air;
a piston disposed to contact the diaphragm and move linearly;
a piston push rod extending from the piston and having one end connected to the slack adjuster; and
a spring having one end supported by the piston and the other end supported by the lower housing,
wherein a thickness of the upper housing is greater than a thickness of the lower housing,
wherein a bottom surface of the upper housing comprises a channel connected to the air supply port, and
wherein the channel is formed of a groove having a '+' shape, in bottom view.

2. The S-cam brake of claim 1, wherein a weight of the upper housing is 8.0 Kg to 9.7 Kg.

3. The S-cam brake of claim 1, wherein a thickness of a central portion of the upper housing is 30 mm to 36 mm.

4. The S-cam brake of claim 1, wherein the upper housing is formed of a casting containing an iron component.

5. The S-cam brake of claim 1, wherein the diaphragm is disposed to contact the bottom surface of the upper housing when the compressed air is not supplied, and the channel forms a space between the bottom surface of the upper housing and the diaphragm.

6. The S-cam brake of claim 1, wherein the channel has a width of 4 mm to 8 mm, a depth of 4 mm to 8 mm, and a length of 80 mm to 100 mm.

7. The S-cam brake of claim 1, wherein the channel is formed of a groove having a circular or polygonal shape, in bottom view.

8. The S-cam brake of claim 1, wherein the channel is formed of a groove having a polygonal funnel shape in which a lower portion thereof is wider than an upper portion thereof.

9. An S-cam brake comprising:
a brake chamber to which compressed air is supplied;
a slack adjuster rotatably connected to the brake chamber;
an S-cam unit having an S-cam connected to and rotating around the slack adjuster; and
a drum having a lining generating braking force with widening according to rotation of the S-cam,
wherein the brake chamber comprises:
an upper housing having an air supply port through which the compressed air is introduced;
a lower housing coupled to the upper housing to form an internal space; and
a diaphragm having edges fixed to the upper housing and the lower housing and deformed by the compressed air,
wherein a weight of the upper housing is 8.0 Kg to 9.7 Kg,
wherein a bottom surface of the upper housing comprises a channel connected to the air supply port, and
wherein the channel is formed of a groove having a '+' shape, in bottom view.

10. The S-cam brake of claim 9, wherein the diaphragm is disposed to contact a bottom surface of the upper housing when the compressed air is not supplied, and a channel forms a space between the bottom surface of the upper housing and the diaphragm.

\* \* \* \* \*